March 10, 1931.  T. L. FAWICK  1,795,426
AUTOMOBILE GEARING
Filed Sept. 5, 1924  6 Sheets-Sheet 1

Witnesses:
W. P. Kilroy
Mary R. L. White

Inventor:
Thomas L. Fawick
Brown, Bottcher, Dinner
Attys

March 10, 1931.  T. L. FAWICK  1,795,426
AUTOMOBILE GEARING
Filed Sept. 5, 1924   6 Sheets-Sheet 3

Witnesses:
W. P. Kilroy
Harry R. L. White

Inventor:
Thomas L. Fawick
By Brown, Boettcher, Dienner
Attys

March 10, 1931. T. L. FAWICK 1,795,426
AUTOMOBILE GEARING
Filed Sept. 5, 1924  6 Sheets-Sheet 5

Witnesses:
W. P. Kilroy
Harry R. L. White

Inventor:
Thomas L. Fawick

March 10, 1931.  T. L. FAWICK  1,795,426
AUTOMOBILE GEARING
Filed Sept. 5, 1924    6 Sheets-Sheet 6

Witnesses:
W. P. Kilroy
Harry R. L. Whit

Inventor:
Thomas L. Fawick
By Brown, Boettcher & Dienner
Attys

Patented Mar. 10, 1931

1,795,426

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

AUTOMOBILE GEARING

Application filed September 5, 1924. Serial No. 735,983.

My invention relates to transmission gearing for automobiles and the like, and it is an improvement upon the invention shown and claimed in my prior Patent No. 1,495,782, issued May 27, 1924.

In said prior patent, I have shown specifically a sliding gear transmission as the primary transmission or accelerating and reverse gear combined with an internal gear and pinion as the speed range gear. These two gears are, in accordance with that invention, combined in a single unitary structure for giving the usual accelerating and reverse function and, in connection therewith, the speed range function all combined in a simple manner. In the improvements which I disclose and claim herein, I have disclosed, among other things, the manner in which the internal gear and pinion for securing the speed range may be combined with a planetary type of accelerating and reverse gear, such as is used in the Ford engine. I also disclose a structure which is adapted to be combined with the torque tube now in use on Ford, Lincoln and Lafayette cars.

The movable gear of my speed range gear is mounted on a swinging carrier which is adapted for movement in the arc of a circle. The mounting of the carrier is such that the movement of the front end of the torque tube is substantially in a vertical plane. As a result, the alignment of the rear axle and wheels is not disturbed and a very simple and inexpensive structure is made possible.

The carrier, which is preferably, but not necessarily, an eccentric drum, carries at its rear end the forward half of the ball and socket joint in the torque tube. The shaft section which is mounted in the carrier carries the forward end of the universal joint in the propeller shaft. Thus, shifting of the carrier from one position to the other moves the joint in the torque tube up or down by an amount corresponding to the change in gear ratio.

The embodiments which I have illustrated are designed to be used in connection with standard accelerating and reverse transmissions as now built, but it will be obvious to those skilled in the art that the accelerating and reverse gear may be re-designed in connection with the speed range gear to give a compact, inexpensive and efficient construction and embodying these qualities to a greater degree than the construction which I have shown as being adapted for attachment to structures already in existence.

One of the desiderata is to keep the length of the speed range gear mechanism at a minimum, and, at the same time, to give the moving parts the necessary bearing support. As one means to accomplish this, I may place a bearing directly outside of the internal gear, as shown, for example, in my copending application 716,357, filed May 28, 1924, to provide a direct radial support for the said internal gear.

Since it is necessary to have one of the gears of the speed range mechanism axially movable in order to plunge the same, I elect in the preferred form to make the spur gear or pinion relatively stationary since it must be unsupported at its outer end at all events. Then I make the internal gear movable and, in order to give it as much support as possible, I place the bearing either radially outside of the internal gear or place it just back of the head of the internal gear and make the bearing itself axially movable. Thus, the movable gear is independently and directly supported in the bearing in the carriage and the shaft section floats inside of its gear, being connected to the gear by suitable splines. This avoids the necessity for taking the bearing stresses through the splined part of the shaft.

I may, if desired, hold the internal gear stationary and plunge the pinion. In that event, the bearing for the pinion is made slidable.

In the present embodiment, I provide a novel connection between the shift lever and the plunging gear. Preferably I connect the inner end of the shift lever to the movable gear at a point lying back of its movable bearing, so that the connection occupies a minimum of space and is light and simple in construction. It also permits the bearing to be brought as near as desired to the outer end of the movable gear. If desired, I may use a shifter fork lying in front of the front bearing, but that is optional.

In connection with gearing of this type, I provide a novel form of lock for locking the car against unauthorized use. The gear of my invention has a non-driving position which is not a normal position and, therefore, accidental locking is not likely to occur. The control handle or its connected parts, must be moved to the central or intermediate non-driving position and then only can the driving connection be broken and the lock be made to hold it in that position.

In order to acquaint those skilled in the art with the manner of constructing and operating my invention, I shall now describe, in connection with the accompanying drawings, a specific embodiment of the invention.

Figure 1:
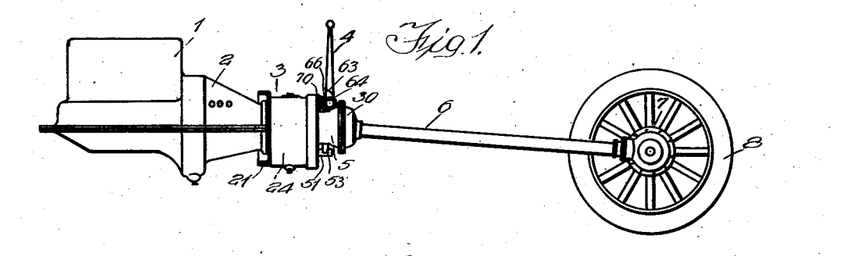
Fig. 1 is a diagrammatic showing of the embodiment of my invention in the power plant and transmission of a Ford touring car.

Referring now to Fig. 1, I have shown the engine 1 with the usual Ford planetary accelerating and reverse gearing 2, and connected to and directly back of the same is the speed range gear mechanism having the controller handle 4. The speed range gearing 3 comprises an eccentric member 5 which provides at its rear end a suitable ball socket for the forward end of the torque tube 6. The torque tube 6 is connected to the differential housing of the rear axle 7, where the drive is transmitted to the rear wheel 8. The accelerating and reverse gearing shown is of the standard model T Ford construction, and it includes a housing 10 which is provided at its rear end with a flange 11. A hemispherical cup-shaped plate 12 is provided to form a bearing support for the rear end of the hollow shaft 13, the bearing consisting in a suitable sleeve 14 fastened into a socket placed in the bottom of the cup 12 and preferably welded thereto. This sleeve 14 contains a lining 15 of anti-friction metal. The cup 12 is shaped normally to receive the forward end of the torque tube, which forward end of the torque tube comprises a hollow ball or spherical enlargement to form a ball and socket joint for the forward end of the torque tube concentric with the flexible coupling of the propeller shaft.

Where the speed range transmission of my invention is to be inserted in cars already built, the torque tube 6 and its propeller shaft 10' are shortened so as to move the universal joint back toward the rear axle by a distance sufficiently great to accommodate the speed range transmission.

Figure 2:
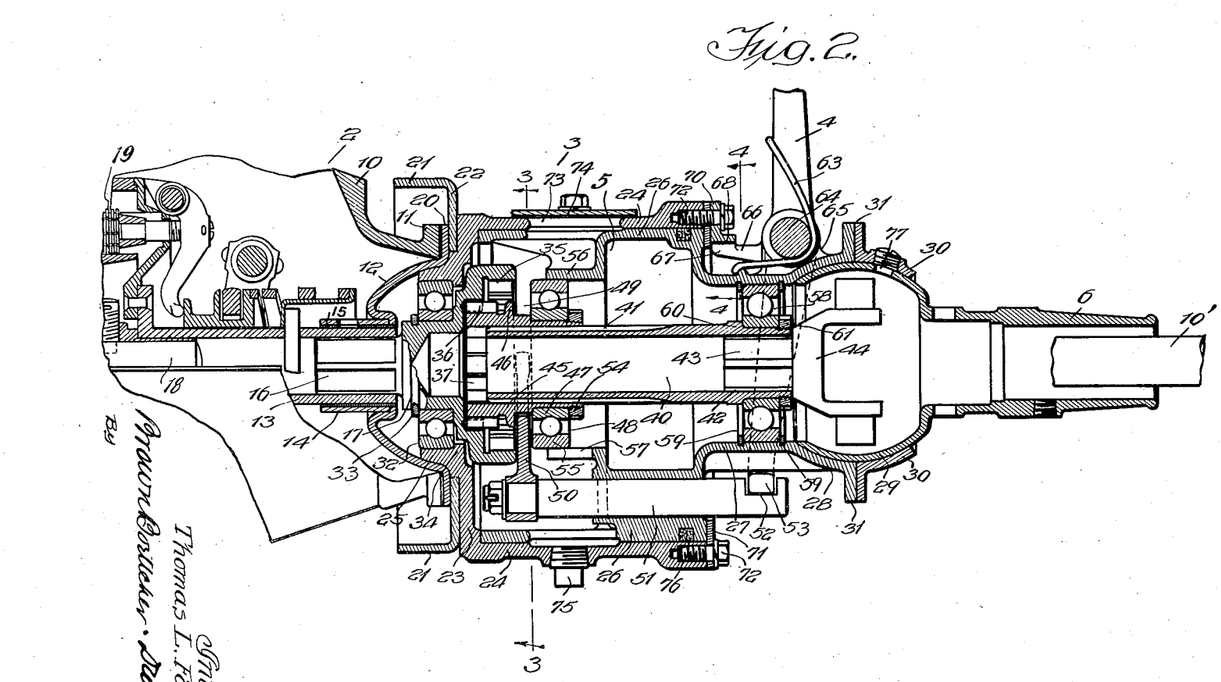
Fig. 2 is a vertical longitudinal section through the rear end of the accelerating and reverse gearing, through the speed range gearing and the front end of the torque tube.
Figure 3:
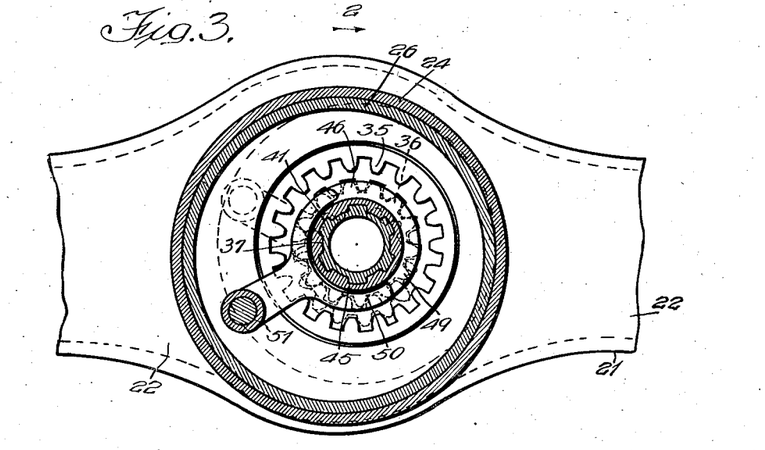
Fig. 3 is a section taken on the line 3—3 of Fig. 2.

The tubular shaft 13 which has its bearing support in the bearing sleeve 14 is broached out at its end to form a square socket for receiving the square stud 16 of the internal gear and socket member 17 which forms a part of my transmission.

The tubular shaft 13 is connected through a clutch and through suitable planetary gears to the co-axial driving shaft 18, which may be termed the engine shaft. That is to say, the driving shaft 18 is connected to the intermediate shaft 13 either through the clutch 19 for direct drive or through suitable concentric shafts or sleeves or planetary gears, as it is understood by those skilled in the art.

The cup-shaped member 12 which supports the bearing sleeve 14 has a suitable flange 20 by which it is supported against the flange 11 of the housing 10. Preferably, but not necessarily, I add a cross frame member 21 which has its web 22 interposed between said web 20 and the end wall 23 of the housing or drum 24 of the speed range transmission 3. The web 20 seats about a boss or hub 25, which centers the housing 24 with respect to the housing 10.

The housing 24 is machined out to receive the eccentric 5, these two parts having cooperating cylindrical surfaces. The cross frame member 21 extends over to the side frame members of the chassis of the vehicle, where the ends of said cross frame member are supported and suitably secured as by riveting.

The eccentric 5 comprises the drum or cylindrical portion 26 and the rearwardly extending neck 27, upon the end of which is formed part of a spherical socket for receiving the enlargement or ball 29 of the forward end of the torque tube 6. The spherical cap member 30 which holds the hollow ball 29 in place in the socket is preferably the standard part which, in the usual Ford transmission, clamps against the flange 20 of the cup member 12. The parts 28 and 30 which form the socket are secured together by suitable flanges shown at 31. The housing 24 contains a bearing 32, the outer race ring of which is seated in the hub or boss 25 and the inner ring of which is mounted on the hub of the internal gear and socket member 17. A snap ring 33 holds the inner race against axial movement with respect to said hub. The result is that the internal gear and socket member 16 is supported against radial stresses by the antifriction bearing 32. The squared shank 16 is pressed into the socket formed in the tubular intermediate shaft 13, and since the outer race of the bearing 32 seats against a shoulder shown at 34, this internal gear and socket member is held against axial and radial movement.

The member 17 has internal gear teeth 35 which cooperate with the external gear teeth 36 of the pinion 37, the pinion 37 being mounted upon a short hollow shaft section 40 in the eccentric 5.

The member 17 has a central socket formed with suitable clutch teeth cooperating with the teeth 36 of the pinion 37 to connect the parts 17 and 40 together so that the drive from the engine shaft 18 and hollow intermediate shaft 13 may be directly through the stud 16 of part 17, then through the clutch teeth of the socket and of the pinion and then through suitable splines 41 to the short shaft section 40. The short shaft section 40, which is carried by the eccentric 5, has a squared socket 42 broached in the rear end of the same to receive the stud or shank 43 of the forward part of the universal joint indicated at 44.

The forward part 44 of the universal joint is connected through a suitable ring to the rear half of the universal joint and on to the propeller shaft 10' and then on to the rear wheel 8 in the usual manner, as is well understood by those skilled in the art. The pinion 37 is formed on the forward end of a sleeve like member 45 which is splined, as indicated at 41, to the shaft section 40. A flange at 46 cooperates with the inner race member 47 of the bearing 48 to form a groove or ring 49 to receive the shifter fork 50. This shifter fork is connected to the front end of a plunger rod 51, the rear end of which extends out of the drum portion 26 along the neck 27 and has a notch 52 in which is received the end 53 of the controlling lever 4.

The inner end of the sleeve 45 is threaded to receive a lock ring 54 for clamping the inner race 47 between it and a suitable shoulder formed in the sleeve. Thus the inner race 47 is securely fastened to the sleeve 45. The outer race 55 rests in a ring 56 supported in a web formed on the interior of the drum 26. The outer race 55 is suitably keyed or splined to said ring 56 to prevent turning of the same. The ring 56 is slotted at a point adjacent the shifter fork 50, as indicated at 57, to permit of sufficient movement of the shifter fork to move the pinion 37 axially clear of the line of the gear teeth 35.

Now, it will be understood that the shifter fork 50 may be moved back of the bearing 48 and the ring 56 extended further forward, the shifter fork 50 passing through the slot 57 and having its ring back of said bearing 48 instead of in front of the same. Thus, the bearing 48 may be brought nearer to the forward end of the shaft section 40 and it will support the pinion 37 in better fashion.

The rear end of the shaft section 40 is supported in a suitable bearing 58, the outer race of which is mounted in the tubular neck 27 and held between two expanding rings 59. The inner race is held between a shoulder on the shaft section 40, indicated at 60, and a clamping nut 61 threaded on the end of said short tubular section 40. The stud or shank 43 of the coupling member 44 is forced into the socket formed in the end of the shaft section 40. It will be seen that by means of the bearing 58 the shaft section 40 is held against endwise movement, the bearing 58 being a ball bearing. The bearings 32, 48 and 58 are ball bearings and take not only the radial thrusts imposed upon them, but also axial thrusts.

The center of the universal joint in the propeller shaft is the same center as that upon which the ball and socket joint in the torque tube 6 is formed, with the result that the torque tube may move freely within limits without cramping the driving connection.

Figure 4:
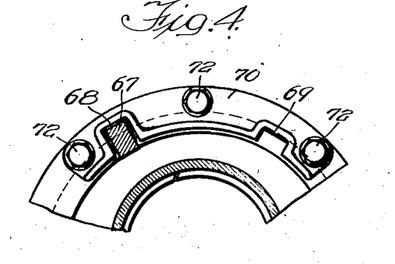
Fig. 4 is a fragmentary sectional view taken on the line 4—4 of Fig. 2.
Figure 5:
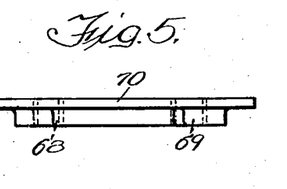
Fig. 5 is a plan view of the gate member.
Figure 6:
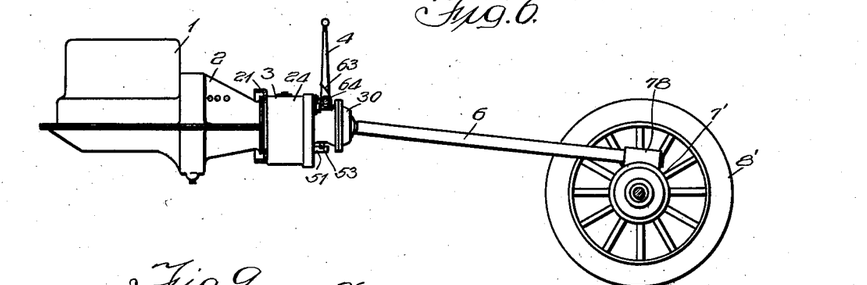
Fig. 6 is a diagrammatic view similar to Fig. 1 showing the power plant, accelerating and reverse gearing speed range gearing and drive shaft for a vehicle like the Ford truck.

The controlling lever 4 is urged in a clockwise direction by a coiled wire spring 63 which is bent about the pivot pin 64, this pivot pin passing through a pair of ears 65 mounted upon the eccentric 5. The controlling lever 4 has a lateral extension 66 ending in a key 67, this key being adapted to enter pockets 68 and 69 (see Fig. 4) formed in a suitable gate member 70. The eccentric 5 is retained in place in the housing 24 by means of a retaining ring 71 held in place by suitable bolts 72. The gate member 70 is arcuate and is arranged about the upper periphery of the housing 24 and is clamped against said retaining ring 71 by bolts 72. It will therefore be apparent that plunging of the pinion 37 into mesh with either the gear teeth 35 or the teeth in the central socket can occur only when the key 67 is in register with the pocket 68 or 69.

The operation of the device is as follows:

Assuming that the speed range gear 3 is employed in connection with the usual Ford pleasure car, to install the device the rear half of the socket for the universal coupling of the torque tube 6 is first disconnected and the rear half 44 of the universal coupling for the shaft is also removed by pulling the stem or stud 43 thereof out of the square socket in the tubular shaft 13. The cross frame member 21 is then attached to the side frame members back of the flange 20 of the cup member 12 and the housing 24 of the speed range gear 3 is then bolted. To do this, the inner mechanism of the speed range gear 3 is removed from the housing 24 so that the screws which hold the end wall 23 to the flanges 11 of the Ford transmission may be fastened in place. Other means of securing these parts together may obviously be provided. The housing 24 may also be secured independently to the cross frame member 22 to secure additional support therefrom. When the housing 24 is applied, the stud 16 of the combined internal gear and socket member 17 is forced into the socket in the tubular shaft 13 and the rest of the speed range gear is then assembled, with the rear half of the universal coupling fastened in the socket of the shaft section 40. The torque tube 6 is shortened to bring the universal coupling therein to the rear of the eccentric drum 26, and the propeller shaft 10' at the same time is shortened to bring the universal joint in register with the universal joint in the torque tube, the effect being that of moving the universal joint in the propeller shaft and in the torque tube back by a distance corresponding to the distance between the ends of the squared studs 16 and 43.

The speed range transmission mechanism may be packed with grease by filling the same through an opening 73 formed through the outer housing 24 and through the inner drum 26 and normally held closed by a cover 74. Suitable lubricant may be introduced through the opening 73 and it may be drained off through a drain plug 75 at the bottom, a suitable opening being provided through the inner drum 26 to permit the same. A felt or other fibrous packing ring 76 is provided at the end of the inner eccentric drum 26 to prevent leakage of lubricant out past the retaining ring 71. The same lubricant which lubricates the gears may also lubricate the bearings and the universal joint, although a separate opening, as indicated at 77, may be provided for lubricating the universal joint.

Assuming now that the car is to be driven under the usual circumstances and a lower speed range, the parts will be as shown in Figs. 1 and 2, the connection from the accelerating transmission to the propeller shaft being direct, the pinion 37 engaging the central clutch socket of the member 17 and the control handle 4 standing in the position shown. If in driving through level country over good roads, such as is encountered on many of the modern highways, it is desired to raise the speed range of the car without excessive speed of the engine, the accelerating transmission is moved to the clutched position, the control handle is pushed forward and swung over to the right to swing the eccentric carriage 26 about a pivot eccentric to the shaft section 40 so as to bring the teeth 36 into line with the teeth 35, whereupon the handle 4 is pulled to the rear and the pinion 37 is plunged forward into mesh with the teeth on the internal gear. The key 67 dropping into the notch 69 holds the parts in that position. The control lever 4 is preferably mounted close to the driver's seat and is relatively short so that it does not interfere with the foot room in the car and does not get in the way of the occupants. The car may then be driven through the higher speed range with a given range of engine speed and the transmission is quiet and efficient.

The device shown in Fig. 2 is in the nature of an attachment for cars already in existence and is preferably sold as a separate unit and applied as above described. Where the principles of my invention are to be applied to new car designs, the construction may be considerably shortened and compact and the position of the pinion and internal gear reversed, with a corresponding change in ratio at the rear axle to permit the normal driving range to occur when the pinion and internal gear are in mesh and to permit of the high speed drive to occur when the pinion and the central socket are in mesh. In other words, the construction approaches more closely to what I have shown in Fig. 7 for the Ford truck type of speed range gear.

Referring now to Figs. 6, 7, 8 and 9, I have shown a speed range gear mechanism such as is suitable as an attachment to present constructions of Ford trucks where the problem is slightly different. In the Ford truck as now constructed, the engine 1 and accelerating and reverse transmission 2 are the same as in the pleasure car, but on the rear axle a worm type of transmission 78 is employed in the differential so that the speed range during normal driving of the truck is as high as is consistent with the ability to haul the capacity load of the truck. In many cases particularly with heavy loads a lower speed range is desirable. It is found, however, that when the truck is run home empty, the driver having no load to transport will wish to speed up the truck, since traveling light it should be capable of moving along at a fair rate of speed.

In the embodiment shown in Figs. 6 to 9, inclusive, I have shown a speed range transmission which provides for the lower or loaded speed range a gear reduction which permits heavy loads to be hauled at a relatively lower rate of speed and which then permits the driving shaft to be coupled directly to the propeller shaft for the higher speed range when the truck is loaded light or empty.

The construction shown in Figs. 6 to 9 is substantially like that shown in Figs. 1 to 5, inclusive, with the exception that the internal gear is connected to the driven shaft; that is, the tubular shaft 95, which forms an intermediate shaft between the engine driven shaft 13 and the propeller shaft 10.

In the embodiment shown in Figs. 6 to 9, I have employed the same reference characters where the same details of construction are employed.

Figure 7:
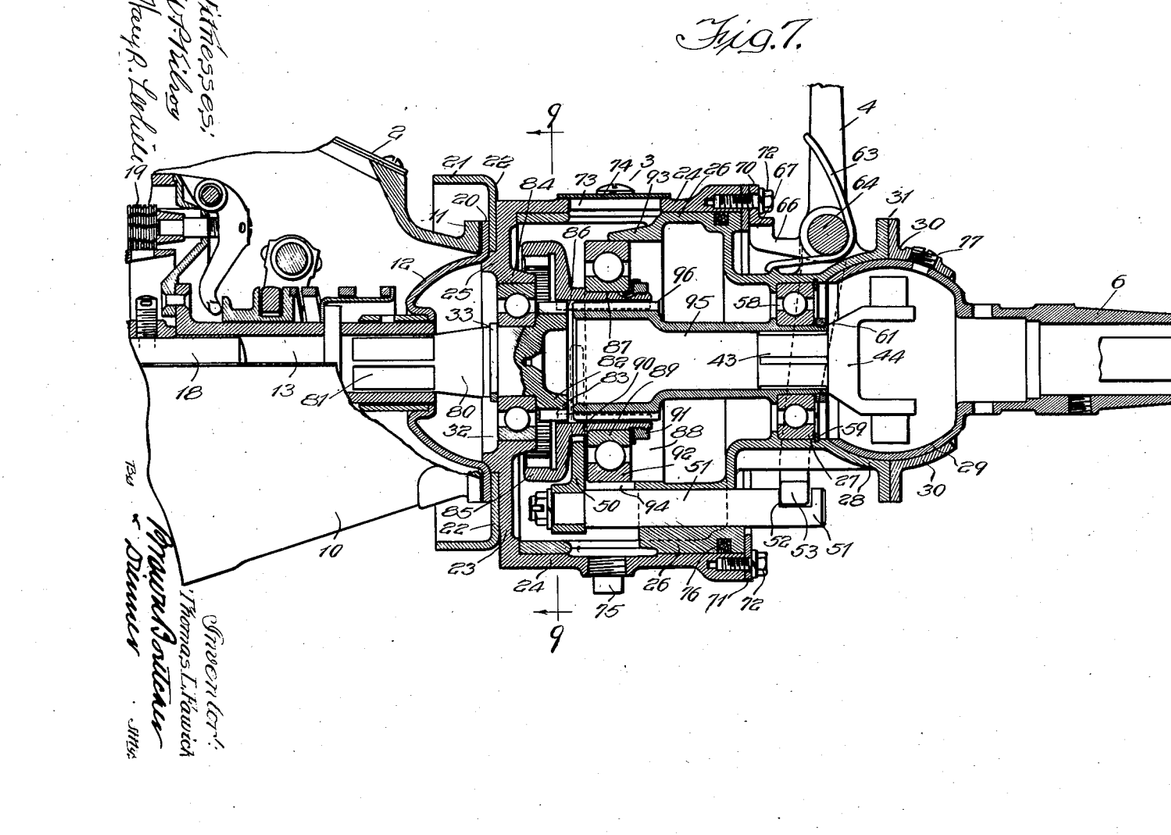
Fig. 7 is a vertical longitudinal section through the accelerating and reverse mechanism to the speed range mechanism and the forward part of the torque tube of the modification shown in Fig. 6.
Figure 8:
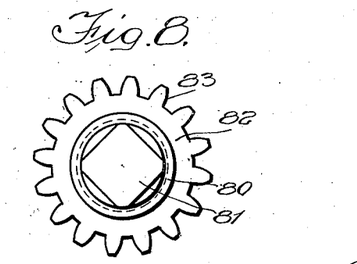
Fig. 8 is a rear elevational view of the pinion shown in Fig. 7.
Figure 9:
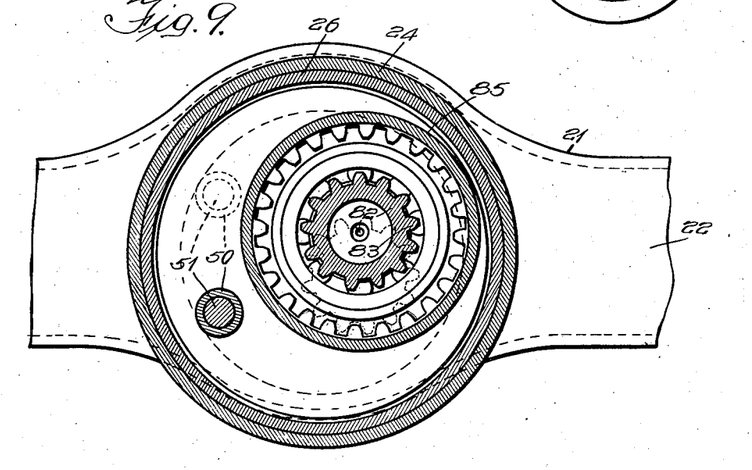
Fig. 9 is a transverse sectional view taken on the line 9—9 of Fig. 7.

The mounting of the outer housing 24 upon the rear end of the transmission housing 10 with the intervening cross frame member 21 is substantially the same as described in connection with the embodiment of Figs. 1 to 5. The stub pinion shaft 80 has a square shank or stud 81 which fits in the square socket in the intermediate tubular shaft 13. The pinion 82 lies inside of said housing 24, a suitable bearing 32 lying in the end wall 23 and supporting said shaft 80. A split retaining ring 33 retains the inner race of the ball bearing 32 upon said pinion. The outer race ring of the bearing 32 rests in a suitable ring 84 which extends inwardly toward the inside of the housing 24 from the end wall 23, so as to support the bearing 32 as closely as possible to the pinion 82 and yet not interfere with the internal gear 85 when the internal gear is plunged forward to have its splines 86 mesh with the teeth 83 of the pinion 82.

The internal gear 85 has a rearwardly extending hollow hub or sleeve 87 containing the splines 86 which are of the same pitch as the teeth 83 of the pinion 82 and also of the same contour or profile in order to avoid play between the parts. This sleeve or hollow hub 87 is supported in an anti-friction bearing 88, in this case a ball bearing, the inner race 89 being clamped between a shoulder 90 and the clamping nut 91 which is threaded upon the rear end of said sleeve or hollow hub 87. The outer race 92 of the bearing 88 is slidably mounted in a supporting ring 93, which ring is connected by a suitable web with the eccentric carriage or drum 26. The outer race 92 is keyed or splined to said ring 93 to prevent rotation of the outer ring. At its lower side the supporting ring or box 93 is slotted, as indicated at 94, to permit the shifter fork 50 to enter the same. The shifter fork 50 reaches upward from its shaft 51 and has its fingers lying between the flange or web of the internal gear 85 and the inner race 89 of the bearing 88. Thus, axial movement of the plunger 51 backward; that is, to the right as viewed in Fig. 7, will move the internal gear 85 and its bearing 88 backward on the splines formed upon the forward end of the shaft section 95. This shaft section 95 has splines 96 meshing with the splines 86. The forward end of the shaft section 95 is enlarged as indicated so as to provide the splines 96 of substantially the same profile and pitch as the profile and pitch of the gear teeth 83, although the splines are preferably shorter. The rear part of the shaft section 95 has a socket formed therein, preferably by broaching, to receive the shank or stud 43 of the rear section 44 of the universal coupling in the propeller shaft 10'. The bearing 58 has its outer race supported in the reduced neck of the eccentric carriage 26 and its inner race is clamped between a shoulder formed on said shaft section 95 and the clamping nut 61.

Thus, the shaft section 95 is supported in the eccentric drum and is held against axial shifting by said ball bearing 58.

In applying the unit which is shown in Fig. 7, the section 44 of the universal coupling which normally occupies the socket in the tubular shaft 13 is removed and is inserted in the socket formed in the shaft section 95. The cap 30 of the universal joint in the torque tube 6 is applied to the rear end of the eccentric carriage, as indicated at 30 in Fig. 7, the torque tube and the propeller shaft being shortened up by an amount corresponding to the distance between the ends of the shanks 81 and 43, as viewed in Fig. 7. The cross frame member 21 may be first applied and then the housing 24, with the eccentric drum or carriage 26 removed, is then secured in place, the stub pinion shaft 80 being thereafter, or at the same time, secured in the end of the tubular intermediate shaft 13. After the housing is clamped in place, the eccentric drum or carriage 26 is put in place and held by the retaining ring 71. The gate member and the retaining ring are held in place by the cap screws 72. The operating handle 4 connects with the plunger 51 for the fork 50 and, by means of this handle 4, the shiftable gear 85, with its bearing 88, is first retracted axially to take the splines 86 and teeth 83 out of mesh, then the eccentric carriage is swung sidewise to shift the axis of the shaft section 85 laterally and to carry with it the joint in the propeller shaft and the joint in the torque tube, whereupon the handle 4 is pulled to the rear, the key 67 entering the notch 69 in the gate member 70, at the same time plunging the shiftable gear 85 into mesh with the pinion 82. With the parts in the position just described, the desired gear reduction between the engine and the rear axle is obtained, and by a like process, the parts may be shifted from the low speed range position to the high speed range position by retracting the shiftable gear and its bearing, moving the shaft section 95 axially into alignment with the pinion 80 and plunging the parts into the position shown in Fig. 7.

In general, the device shown in Figs. 6 to 9 is the same as the device shown in Figs. 1 to 5, with the exception of the arrangement of the internal gear and pinion, the parts being reversed. However, it is to be noted that, as explained in my prior patent, the ratio change which is secured in the speed range gearing should be designed to work with a proper reduction in the rear axle.

It is to be noted that where economy of space is desirable, the shaft section 95 may be shortened, and, in fact, if desired, the universal coupling in the torque tube and propeller shaft may be telescoped with the enlarged front end of the shaft section 95.

Figures 10, 11, 12:
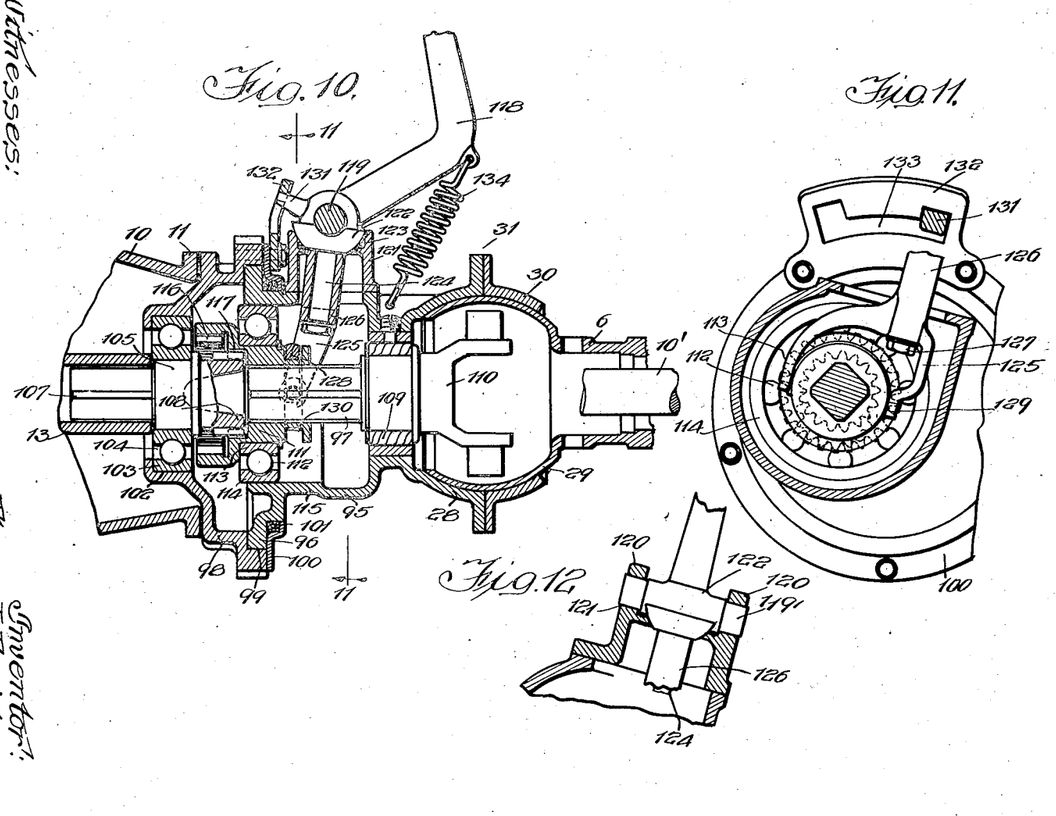
Fig. 10 is a longitudinal vertical section of a modified form of my invention.
Fig. 11 is a transverse section taken on the line 11—11 of Fig. 10.
Fig. 12 is a fragmentary section through the tracing for the controlling lever.

In Figs. 10, 11 and 12 I have shown a modification in which the eccentric carriage 95 is mounted by means of a flange 96. This flange 96 takes the place of the cylindrical drum 26 shown in the previous forms. This flange 96 has an outer cylindrical surface which is eccentric with respect to the intermediate shaft 13 and the shaft section 97 which is journaled in said carriage 95.

The frame or housing 98 is bolted to the flanges 11 of the gear box 10 and it provides an eccentric notch or bore 99 for relieving the flange 96 of carriage 95. The flange is held in place by a retaining ring 100 which contains a felt packing ring 101 to retain grease and to exclude grit.

The frame 98 projects forward into the gear housing 10 and provides a seat 102 for the outer race ring 103 of ball bearing 104. A stub pinion shaft 105 is mounted in the inner race of the bearing 104. At its front end it has a squared stem or stud 107 fitting into the square socket in the rear end of shaft 13. At its rear end the shaft 105 has the pinion 108.

The eccentrically mounted carriage 95 has a hemispherical socket 28 at the rear end thereof. A co-operating ring 30 of spherical contour is connected thereto at flanges 31, to form the outer part of a hollow base and socket joint for the forward end of torque tube 6.

A roller bearing 109 in the rear end of carriage 95 mounts the rear end of shaft section 97. This shaft section has an integral fork 110 formed thereupon at its rear end. The fork 110 forms one part of a universal joint in the propeller shaft coincident with the base and socket joint 29—30 in the torque tube. The forward end of shaft section 97 is squared or otherwise splined for driving the internal gear and clutch member 111. This member 111 is independently journaled in the carriage 95 by means of the ball bearing 112, the inner race 113 of which is fastened to said member 111 and the outer race of which is slidably keyed in the cylindrical bore 115. That is to say the member 111 is rotatable in the bearing 112, which slides axially with the member 111 as it is shifted axially on the squared shaft 97.

The member 111 has an internal gear 116, and a clutch socket 117 both having teeth meshing with the teeth of pinion 108. The former to provide a gear reduction and the latter for direct drive. The eccentrically mounted carriage 95 is arranged to shift the shaft laterally up and down for securing this change in driving ratio. The member 111 is adapted to be shifted axially to mesh the teeth. This rocking of the carriage and plunging of the gear is accomplished by means of an operating handle 118 which is pivoted on a transverse pin 119 mounted in lugs 120 formed integral with a tubular extension 121 on top of carriage 95. The handle 118 has a spherical surface 122 adapted to contact with a felt washer 123 seated in the top of said tubular extension 121.

The handle 118 has a pin 124 integral therewith extending down below pivot 119. A shifter fork 125 has a tubular stem 126 fitting over said pin 124 and is held in place by a nut 127 on the end of the pin 124. The shifter fork 125 has two arms pivoted to pins 129 formed on a shifter yoke 128, which yoke lies in groove 130 formed in the rear end of member 111.

By forward and backward movement of handle 118 the member 111 is shifted backward and forward, carrying with it bearing 112.

Handle 118 has a key 131, preferably formed integral therewith playing in a gate or slot in the guard 132. The guard 132 has a circular slot 133 concentric with flange 96 and it has notches for retaining the key 131 against rotation. A spring 134 keeps the key 131 in position.

While I have shown the internal gear and clutch member 111 as axially movable and pinion 108 stationary, it will be apparent to those skilled in the art that the relation of these parts may be reversed when a step up instead of a step down is desired. Also, it will be plain to those skilled in the art that the movable member 111 may have a ball groove for bearing 112 cut directly in the outside of the same instead of having a separate ring 113.

The operation will, it is thought, be clear from the foregoing.

Figure 13:
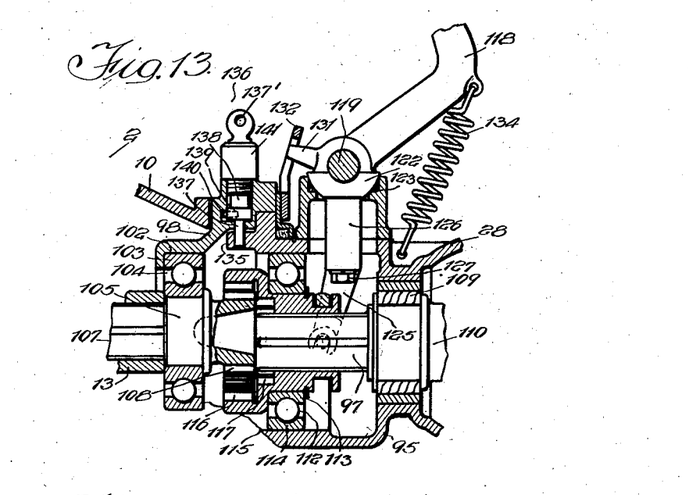
Fig. 13 is a view similar to Fig. 10 of a modification embodying a locking structure in accordance with my invention.

In Fig. 13 I have shown how to lock the car in neutral, i. e., non-driving position. A circular flange 135 extends forward on the carriage 95. Above this flange 135 and on the frame or housing 98, lies a plunger lock 136 which has a pin or bolt 137 guided in said housing 98 and adapted to be projected into an aperture in the flange 135. The aperture is formed in the central part of the flange 135 is such position that pin or bolt 137 cannot be projected to the same until the speed range gear is in the position shown in Fig. 13, i. e., non-driving position when the pinion 108 is out of mesh with both the internal gear 116 and the clutch socket 117.

The plunger 138 which carries said pin or bolt 137 has a laterally projectible bolt or latch 139 adapted to enter a notch 140 when the plunger 138 and its attached pin 137 are projected into locking position. The bolt 139 is spring pressed and is adapted to be automatically projected into notch 140 upon depression of plunger 138. Said plunger 138 carries in its upper end a key releasable member for retracting bolt 139, preferably in the form of the well known pin tumbler barrel. This barrel is carried in the upper end of housing 141, which is mounted on top of the housing 98.

The operation of this locking mechanism is believed to be clear from the above. The speed range gearing is the same as described in connection with Figs. 10, 11 and 12. It will be apparent that if the gear is to be locked into neutral, it requires a conscious effort to move the gear to neutral position, but the operation is very simple. The danger of accidentally locking the gear in neutral is negligible.

Apertures may be provided in flange 135 for locking the gear in either meshed position if so desired.

Accidental depression of plunger 138 may also be prevented by providing another notch like 140 into which latch 139 drops when the bolt is raised; when so constructed the key 137' is required to lock the gear. As shown in the drawing, the key is not needed to plunge the lock for locking in neutral or other position.

Figures 14, 15:
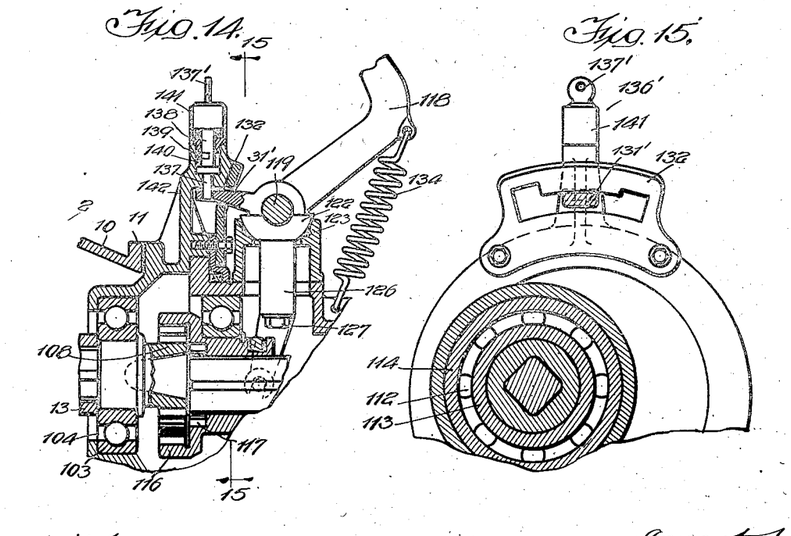
Fig. 14 is another modification of the structure shown in Fig. 10, also embodying a locking structure.
Fig. 15 is a cross sectional view of the same taken on the line 15—15 of Fig. 14.

In Figs. 14 and 15, I have shown a modified form of lock in which an automatic plunger lock 136' is mounted on a bracket 142 and is connected to guard 132. In this case the key 136' which is guided in the guard 132 is extended to lie under the lock 136'. The key 136' has an aperture adapted to be entered by the bolt 137, when plunger 138 is depressed. The bolt 137 is not interlocked by key 131' since it is not wide enough to do so. This permits the structure to lock the gear to mesh either way or out of mesh in neutral.

It is believed that the operation will be clear from the above. In either case when locked in neutral the carriage cannot be rocked and the gear members cannot be meshed.

I do not intend to be limited to the details shown nor described.

I claim:

1. In an automobile having a rear axle housing, a torque tube extending forward and upward therefrom, a propeller shaft in said housing, a tube containing a carriage, a shaft section having bearings in said carriage, a driving shaft, gearing between said driving shaft and said shaft section, said gearing including a pinion gear and an internal gear, said carriage being movable to shift the shaft section and its gear laterally up and down, said torque tube having its forward end joined to said carriage by a flexible joint and said propeller shaft being joined to said shaft section by a flexible joint registering with the flexible joint in the propeller shaft, said forward part of the torque tube being shiftable with said carriage.

2. In combination, driving mechanism having a driving pinion, a housing, an eccentric carriage supported in the same, a shaft section in said carriage, an internal gear splined to the shaft section and adapted to be plunged into mesh with said pinion, a torque tube connected by a universal joint to said carriage and a propeller shaft connected by a registering universal joint to said shaft section, said carriage being adapted to shift the end of the torque tube up and down.

3. In combination, a driving shaft, a pinion fixed thereupon, a shaft section, a movable carriage therefor for shifting said shaft section laterally, an axially movable internal gear connected to said shaft section and an axially shiftable bearing for said gear mounted in said carriage.

4. In combination, a driving pinion, an axially shiftable internal gear, an eccentric drum for supporting said internal gear and an anti-friction bearing for the internal gear axially shiftable in said drum.

5. In combination, a pinion gear, an internal gear, one of said gears being relatively fixed and the other relatively movable laterally and axially, a movable carriage for said movable gear to move the same laterally and a bearing connected to said movable gear and shiftable axially with said movable gear in said carriage.

6. In combination, a transmission housing, a cup-shaped closure for the end of the housing, a shaft in the housing having a bearing in said cup-shaped member, said shaft having a socket in the end thereof, a supplementary housing secured to the end of the first housing, a stub shaft having a shank fitting in the socket, said supplementary housing having a transverse wall, a bearing for the stub shaft in said transverse wall, an eccentric drum mounted in said supplementary housing, a short shaft section carried in said drum and adapted to be translated laterally by movement of the drum, a torque tube flexibly joined to the eccentric drum, a propeller shaft flexibly connected to the shaft section, a pair of gears connecting said shaft section and said stub shaft, said gears comprising a spur pinion and an internal gear, one of said gears being slidably connected to said shaft section, and an axially shiftable bearing for said one gear.

7. In combination, a housing having an end wall, a bearing in said end wall, a stub shaft in said bearing having a non-circular shank extending from the housing, an eccentric carriage in said housing, a shaft section in said carriage movable laterally therewith, said shaft section having a socket at its rear end for receiving a part of a universal joint, a pair of gears comprising an external gear and an internal gear connecting said stub shaft and said shaft section, and a torque tube connected to the carriage by a universal joint, said eccentric carriage being movable to shift said shaft section and said torque tube up and down.

8. In combination, a housing having an end wall, a bearing in said end wall, a stub shaft in said bearing having a non-circular shank extending from the housing, an eccentric carriage in said housing, a shaft section in said carriage movable laterally therewith, said shaft section having a socket at its rear end for receiving a part of a universal joint, a pinion fixed on the stub shaft, an internal gear slidably connected on the forward end of said shaft section, and a torque tube connected to the carriage by a universal joint, said eccentric carriage being movable to shift said shaft section and said torque tube up and down.

9. In combination, a housing having an end wall, a bearing in said end wall, a stub shaft in said bearing having a non-circular shank extending from the housing, an internal gear fixed on the end of the stub shaft within said housing, an eccentric carriage in said housing, a shaft section in said carriage movable laterally therewith, said shaft section having a socket at its rear end for receiving a part of a universal joint, a pinion keyed to the forward end of the shaft section and axially movable with respect thereto, a torque tube connected to the carriage by a universal joint, said eccentric carriage being movable to shift said shaft section and said torque tube up and down.

10. In combination, a housing having a bearing at its front end, a stub shaft in said bearing, an eccentric carriage in said housing, a shaft section mounted in the carriage, a pair of gears comprising an internal gear and a spur pinion connecting said shaft, one of said gears being splined to the shaft section and being axially shiftable, a bearing for said shiftable gear, said bearing being axially shiftable with said gear, a handle pivoted to the carriage for swinging the carriage laterally, and a shifter fork for the shiftable gear connected to said lever.

11. In combination, a housing having a bearing at its front end, a stub shaft in said bearing, an internal gear fixed on the stub shaft within said housing, an eccentric carriage in said housing, a shaft section mounted in the carriage, a spur pinion splined to the shaft section and being axially shiftable with respect thereto, a bearing for said pinion, said bearing being axially shiftable with the pinion, a handle pivoted to the carriage for swinging the carriage laterally, and a shifter fork for the pinion connected to said lever.

12. In combination, a housing having a bearing at its front end, a stub shaft in said bearing, a spur pinion mounted on the end of the stub shaft within the housing, an eccentric carriage in said housing, a shaft section mounted in the carriage, an internal gear splined on the shaft section and axially movable with respect thereto, a bearing for said internal gear, said bearing being axially shiftable with the gear, a handle pivoted to the carriage for swinging the carriage laterally, and a shifter fork for the internal gear connected to said handle.

13. A speed range gear device comprising a housing having a front end wall, a bearing supported in said front end wall, a pinion mounted in said bearing, an eccentric drum mounted in the housing, a tubular driven member mounted in said housing, said tubular driven member being adapted to be connected through a universal joint to a proller shaft, an internal gear splined for axial movement on said tubular member, a bearing mounted on the outside of said internal gear and shiftable axially therewith, an eccentric carriage in said drum having a box or ring for supporting said bearing, and a lever for swinging said drum or carriage laterally and for plunging the internal gear and its bearing axially.

14. Speed range gearing comprising a housing, a bearing at the forward end of the housing, a pinion shaft supported in said housing and having an external pinion gear, an eccentric carriage in the housing, a tubular shaft member in said carriage, an internal gear having a sleeve splined to said tubular shaft, a bearing axially slidable in the carriage and fixed on the outside of the external gear, universal joint mechanism for a torque tube secured on the rear end of the movable carriage, and universal joint mechanism for a propeller shaft connected to the tubular shaft and means for angularly moving the movable carriage and a fork for said internal gear connected to said means for axially plunging said internal gear.

15. In combination, a housing, a shaft section, an eccentric carriage for the shaft section in said housing, a driving pinion, an internal gear splined on the shaft section for meshing with the pinion or for clutching the shaft section thereto, a propeller shaft connected to the shaft section and a torque tube surrounding the propeller shaft and connected to the eccentric carriage and being shiftable with said carriage.

16. In combination, a shaft section, a movable carriage for the shaft section, a stationary housing for the carriage, a pinion having a bearing in the housing, an internal gear splined on the shaft section and being adapted to mesh with the pinion or to clutch the shaft section to the same, a universal joint for a propeller shaft connected to the shaft section, and a concentric universal joint for a torque tube connected to the carriage and shiftable therewith.

17. In combination, a shaft section, a movable carriage therefor, a stationary housing for the carriage, a pinion having a bearing in said housing, a cooperating internal gear splined on the shaft section, said internal gear having its own bearing in said carriage, said gear and bearing being axially movable independently of the carriage.

18. In combination, an internal gear and clutch member, a pinion member, one of said members being relatively stationary, the other being relatively shiftable, laterally and axially; a rocking carriage for the relatively shiftable member and a roller bearing mounted on said shiftable member between it and the carriage and being axially movable in the carriage with said shiftable member.

19. In combination, an internal gear and clutch member, a pinion member, one of said members being relatively stationary, the other being relatively shiftable, laterally and axially; a rocking carriage for the relatively shiftable member and a roller bearing mounted on said shiftable member between it and the carriage and being axially movable in the carriage with said shiftable member and common means for rocking the carriage and shifting said last named member.

20. In combination, an internal gear and clutch member, a pinion member, one of said members being relatively stationary, the other being relatively shiftable, laterally and axially; a rocking carriage for the relatively shiftable member and a roller bearing mounted on said shiftable member between it and the carriage and being axially movable in the carriage with said shiftable member and means to lock said gear members in a non-meshing position.

21. In combination, an internal gear and clutch member, a pinion member, one of said members being relatively stationary, the other being relatively shiftable, laterally and axially; a rocking carriage for the relatively shiftable member and a roller bearing mounted on said shiftable member between it and the carriage and being axially movable in the carriage with said shiftable member, and means for locking said carriage in predetermined neutral position.

22. In combination, an internal gear and clutch member, a pinion member, one of said members being relatively stationary, the other being relatively shiftable, laterally and axially; a rocking carriage for the relatively shiftable member and a roller bearing mounted on said shiftable member between it and the carriage and being axially movable in the carriage with said shiftable member and common means for rocking the carriage and shifting said last named member, and locking means for said common means to prevent rocking of the carriage or shifting of said latter member.

23. In a transmission gearing in combination, a stationary casing, a pair of rotatable members, internal gearing and a dental clutch rigidly carried by one of the members, and a pinion adapted to mesh with either the gear or the clutch, means including a shiftable bar for imparting longitudinal movement to one of the said rotatable members, a bearing shell mounted within the casing, having its center of rotation out of alignment with one of the shafts and a shipper-lever trunnioned to said shell and engaging the bar whereby the pinion teeth and the gear or clutch teeth may be brought into engagement.

24. In combination, a pair of rotatable members, one having internally formed teeth and the other externally formed teeth, a casing adapted to support one of said members, a shell mounted to turn within the casing having its axis of rotation eccentric to one of the said members and having a portion thereof extending entirely outside of the casing, said shell being adapted to support the other of said members, means including a lever pivoted to the said portion of the shell for rotating the shell to bring certain of the teeth on each member into alignment with corresponding teeth of the other, and means including said rotating means whereby one of the members may be slid longitudinally with reference to the other and into driving engagement therewith.

25. In a gearing, a casing, an eccentric bearing having a portion thereof extending externally of the casing and forming a part thereof, a gear carried by the bearing, a cooperating gear carried by the casing, and means including a lever pivoted to the external portion of the eccentric for moving the eccentric to bring the teeth of the gears into alignment and having a connection with one of the gears for subsequently bringing the teeth thereof into driving engagement with the other gear.

In witness whereof, I hereunto subscribe my name this 28th day of August, 1924.

THOMAS L. FAWICK.